April 25, 1950 T. McELRATH, JR., ET AL 2,505,054
INERT GAS BLANKETED OSCILLATORY WELDING ROD FEED
Filed May 13, 1949

INVENTORS
Thomas McElrath, Jr.
Francis M. Drake
BY D.C. Harrison
ATTORNEY

Patented Apr. 25, 1950

2,505,054

UNITED STATES PATENT OFFICE 2,505,054

INERT GAS BLANKETED OSCILLATORY WELDING ROD FEED

Thomas McElrath, Jr., Chatham, and Francis M. Drake, Cranford, N. J., assignors to The Linde Air Products Company, a corporation of Ohio Application May 13, 1949, Serial No. 93,164

6 Claims. (Cl. 219—8)

This invention relates to inert gas blanketed oscillatory welding rod feed, and more particularly to method and apparatus for supplying welding rod to the weld puddle formed by an arc blanketed by a stream of non-oxidizing gas containing inert noble monatomic gas such as argon or helium.

In the feeding of filler rod to arc welding operations of this character, difficulty has been experienced in preventing the rod from being fed into the arc, which greatly disturbs the arc or from being fed ahead of the puddle, either of which produces a poor weld. It is therefore the main object of the present invention to make sure that the welding rod is fed directly into the weld puddle.

Another object is to rid the puddle of entrapped gases and any foreign materials present, and to produce welds which are better quality, cleaner, and have less porosity.

According to the present invention, the method of inert gas blanketed arc welding comprises maintaining an arc with respect to the work to form a weld puddle, passing an annular stream of non-oxidizing gas containing an inert noble monatomic gas along the electrode to blanket the arc and puddle, simultaneously oscillating said arc and gas stream and a filler rod relative to the weld puddle, and during such oscillation advancing the filler rod into the weld puddle.

The process utilizes a welding head on which is mounted a rod feeding mechanism and an inert gas blanketed arc welding torch mounted on a self propelled carriage for travel along the weld seam. The torch and rod feed mechanism simultaneously oscillate to and fro along the weld seam while the rod is fed and simultaneously dipped as the torch reaches the rear or trailing edge of the puddle. Dipping the rod in the puddle is desirable because merely introducing the rod into the arc greatly disturbs the arc.

The oscillating mechanism is desirable to make the rod feed easy and practical to accomplish. The motion to and fro over the puddle serves to work the puddle in a quiet manner and aids the original plate edges in flowing together. Also, entrapped gases and any dust or foreign matter are easily floated out of the seam. Furthermore, the intermittent dipping of the rod in the puddle prevents burning through the plate when no backing up means is used, as has been frequent with prior methods.

Figure 2:
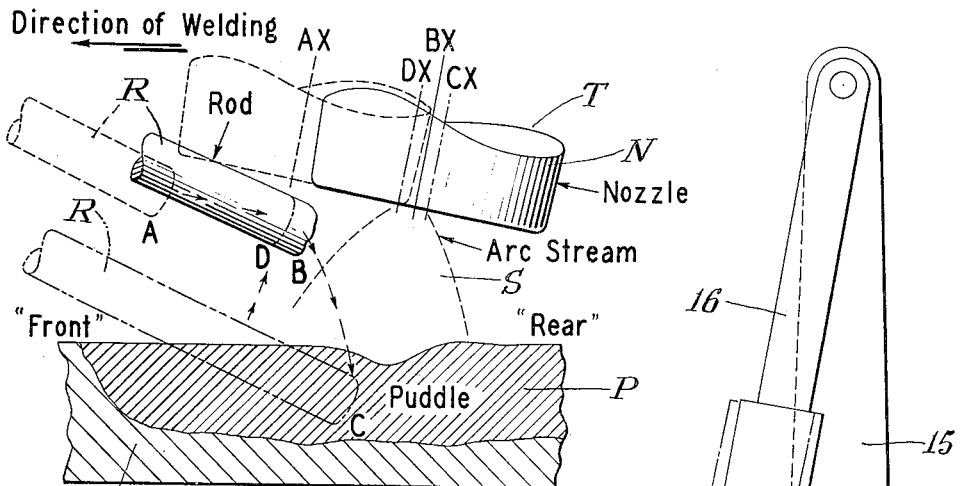
Figure 1:
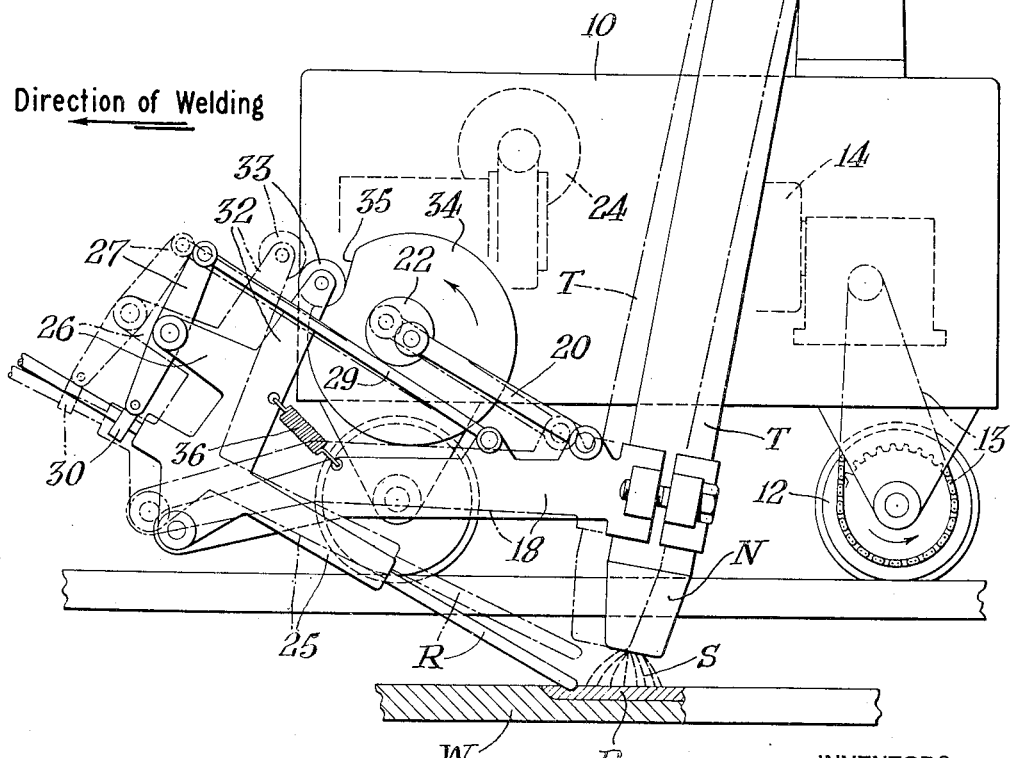

Other objects and features of novelty will be apparent from the following description and the accompanying drawings, in which:

Fig. 1 is a side elevation of apparatus according to and for carrying out the method of the present invention; and Fig. 2 is a diagrammatic view of the successive positions of the arc and welding rod with respect to the weld puddle, in the relative motions thereof according to the method of the present invention.

The welding is accomplished by means of a torch T which may be of the type shown in the copending application of Harry T. Herbst, Serial No. 668,517 filed May 9, 1946, now Patent No. 2,468,807, dated May 3, 1949, or of the type shown in the copending application of T. McElrath, Jr., Serial No. 76,063, filed February 12, 1949. Electric welding current is supplied to the torch T which maintains an arc S with respect to the work W, which forms a weld puddle P of molten metal. The torch T comprises a nozzle N through which an annular stream of nonoxidizing gas containing essentially an inert noble monatomic gas such as helium or argon passes down surrounding the arc S and blanketing the weld puddle P.

A welding rod R is supplied to the process, and the rod R and the torch T are oscillated simultaneously with respect to the weld puddle P. In addition, the rod R is simultaneously given an intermittent advancing movement timed with the cycle of such oscillation. Thus as shown in Fig. 2, the rod R moves from position A to B while the torch T moves from position AX to BX. Then the rod moves downwardly and forwardly from position B to C, dipping the end of the rod into the front of the weld puddle, while the torch moves the short distance from BX to CX. A part of the rod R melts off and stays in the puddle P, but the unmelted remainder of the rod R moves from position C to position D, while the torch T moves from position CX to DX.

The machine shown in Fig. 1 comprises a carriage 10 having wheels 12 driven by a chain 13 from a motor 14. The carriage 10 has mounted thereon an upright or pedestal 15 on which is pivoted a torch holder 16.

Secured to the torch T is an arm 18 connected by a link 20 to an eccentric 22 driven in the direction of the arrow shown by a motor 24. The motion of the eccentric 22 moves the torch T from the full line position to the dotted line position shown.

Pivoted on the end of the arm 18 is a rod guide 25 having a bracket 26 on which is pivoted a lever 27, the upper end of which is connected by a link 29 to the torch arm 18. The other end of the lever 27 carries a clutch ring 30 adapted to grip the rod R on the forward stroke, and to release it for the reverse stroke. The bracket 26 has an arm 32 carrying a roller 33 engaging the periphery of a cam disk 34 rotatable with the eccentric 22 and having a notch 35 adapted to receive the roller 33. A spring 36 moves the roller 33 into contact with the cam 34. When the roller 33 enters the notch 35 the rod guide swings about its pivot on the arm 18 and the bracket 26 pulls the lever 27 forward about its pivot on the link 29, causing the clutch ring 30 to grip the rod R and move it forward.

While the invention is of advantage in welding various metals, it is of particular advantage in welding heavy aluminum. Thicknesses up to seven eighths of an inch have been welded with a square butt joint, one pass from each side. For thickness from three sixteenths of an inch up to two and a half inches, aluminum rod of from one eighth to five sixteenths inch diameter is employed. The rod angle at introduction into the puddle is 20 to 25 degrees from the horizontal. A range from zero up to one quarter pound of rod per minute is deposited. A deposit of 0.067 pound per minute amounts to one and a half inches of three sixteenths under rod per inch of weld or four tenths inch of three sixteenths inch rod per oscillations.

The rod is dipped approximately one quarter inch into the puddle. The end of the rod is moved with an amplitude twice the torch motion. The dip and feed actions occur at the end of the motion toward the rear of the puddle or toward the welded seam.

The frequency of the torch motion ranges from 50 to 75 oscillations per minute. The torch moves with an amplitude adjustable from one eighth to three quarters of an inch. The oscillating rod may be introduced into the puddle from the side instead of ahead of the arc.

What is claimed is:

1. Inert gas blanketed arc welding method which comprises maintaining an arc with respect to the work to form a weld puddle, supplying an annular stream of non-oxidizing gas to blanket said arc and weld puddle, and feeding filler rod into said gas blanketed puddle by an oscillatory movement of successive cycles each comprising an advancing movement to dip the end of the rod into the weld puddle, and another movement to lift the unmelted end of the rod out of the weld puddle.

2. Inert gas blanketed arc welding method which comprises maintaining an arc with respect to the work to form a weld puddle, supplying an annular stream of non-oxidizing gas to blanket said arc and weld puddle, and feeding filler rod into said gas blanketed puddle in successive cycles each comprising a downward and forward movement to dip the end of the rod into the weld puddle, and an upward movement to lift the unmelted end of the rod out of the weld puddle.

3. Inert gas blanketed arc welding method which comprises maintaining an arc with respect to the work to form a weld puddle, supplying an annular stream of non-oxidizing gas to blanket said arc and puddle, and feeding filler rod into said gas blanketed puddle in successive cycles each comprising advancing said filler rod through said gas blanket for a deposition increment, dipping the gas blanketed end of said rod into the puddle to melt off said deposition increment, and lifting the unmelted remainder of said rod out of said gas blanketed puddle for another cycle.

4. Inert gas blanketed arc welding method which comprises maintaining an arc with respect to the work to form a weld puddle, supplying an annular stream of non-oxidizing gas to blanket the arc and puddle, simultaneously oscillating said arc and gas stream and a filler rod relative to the weld puddle, and during such oscillation advancing said filler rod into said weld puddle.

5. Apparatus for inert gas blanketed arc welding which comprises a torch for maintaining an arc with respect to the work to form a weld puddle, said torch having a nozzle for supplying an annular stream of non-oxidizing gas to blanket said arc and weld puddle, and mechanism for feeding filler rod into said gas blanketed puddle in successive cycles comprising a gripper for advancing said rod downwardly and forwardly to dip the end of the rod into the weld puddle, and a cam for causing an upward movement to lift the unmelted end of the rod out of the weld puddle.

6. Apparatus for inert gas blanketed arc welding which comprises a torch for maintaining an arc with respect to the work to form a weld puddle, said torch having a nozzle for supplying an annular stream of non-oxidizing gas to blanket said arc and weld puddle, and mechanism for simultaneously oscillating said arc and gas stream and a filler rod relative to the weld puddle, and a gripper engaging said rod during said oscillation for advancing said rod into said weld puddle.

THOMAS McELRATH, Jr.
FRANCIS M. DRAKE.

REFERENCES CITED

The following references are of record in the file of this patent:

UNITED STATES PATENTS

| Number | Name | Date |
| --- | --- | --- |
| 2,093,881 | Conrad | Sept. 21, 1937 |